Dec. 9, 1969  MASAJI MOCHIZUKI  3,482,431

GAS CONCENTRATION MEASURING INSTRUMENT

Filed April 17, 1968  4 Sheets-Sheet 1

INVENTOR.
Masaji Mochizuki

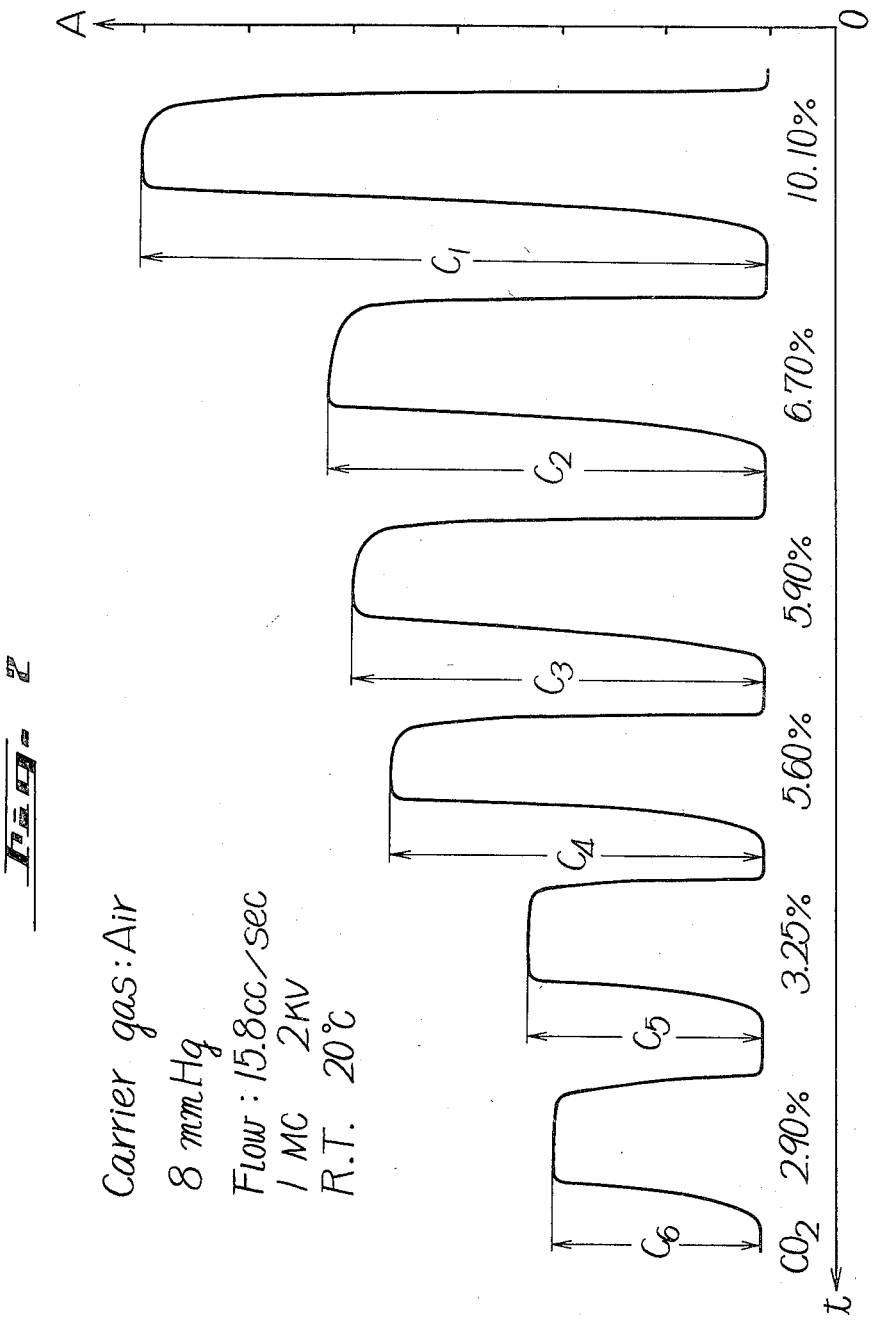

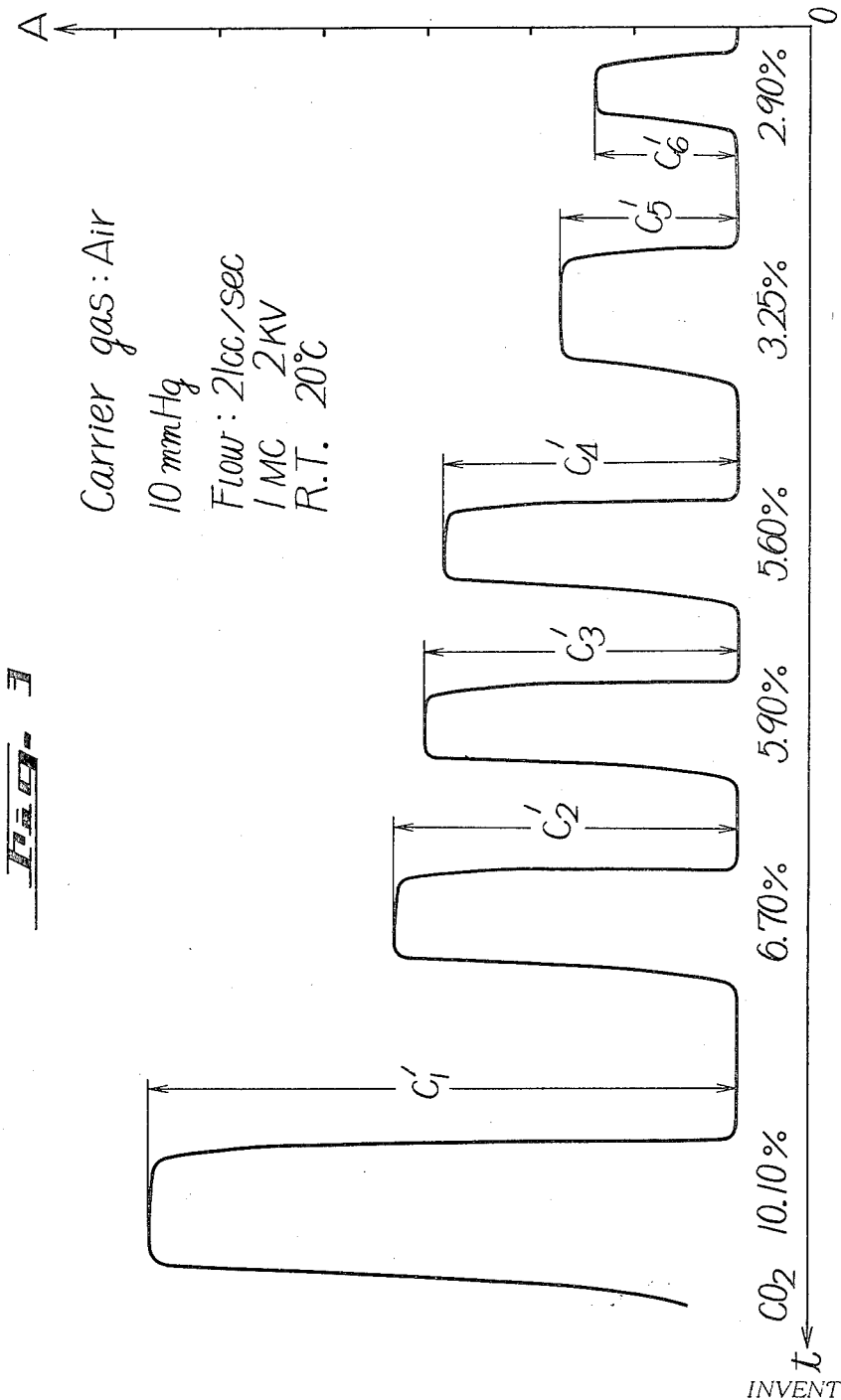

United States Patent Office 3,482,431
Patented Dec. 9, 1969

3,482,431
GAS CONCENTRATION MEASURING
INSTRUMENT
Masaji Mochizuki, Sapporo-shi, Japan, assignor to San-Ei Sokki Kabushikikaisha (San-Ei Instrument Co., Ltd.), Tokyo, Japan, a corporation of Japan
Filed Apr. 17, 1968, Ser. No. 722,055
Claims priority, application Japan, Apr. 21, 1967, 42/25,755
Int. Cl. G01n *31/00*
U.S. Cl. 73—23          9 Claims

ABSTRACT OF THE DISCLOSURE

A gas concentration measuring instrument having means for supplying a sample gas, means for suppling a carrier gas, a common passage, means for introducing the sample and carrier gases into the common passage in a vacuum state, means for ionizing the mixed sample and carrier gases, and circuit means for passing therethrough a current produced by the ionized mixture gas.

BACKGROUND OF THE INVENTION

Field of the invention

This invention relates to a gas concentration measuring instrument, and more particularly to an instrument for measuring the concentration of ionizable gases such as nitrogen $N_2$, the so-called nitrous oxide gas $N_2O$, carbonic acid gas $CO_2$, oxygen $O_2$ and so on.

Description of the prior art

There have heretofore been proposed gas concentration measuring instruments such as a thermal conductivity type gas analyzer, an infrared gas analyzer and magnetic wind type gas analyzer, all of which take several seconds to several ten seconds for each measurement. That is, the prior art instruments are all slow in response speed, which is a fatal drawback from the practical point of view. Consequently, the conventional gas concentration measuring instruments are not suited for rapid measurement of gas concentrations and further they cannot be employed for measurement of continuously changing gas concentrations.

SUMMARY OF THE INVENTION

The principal object of this invention is to provide a novel gas concentration measuring instrument which is free from drawbacks experienced in the prior art such as mentioned above.

Another object of this invention is to provide an inexpensive gas concentration measuring instrument which allows rapid and precise measurements of gas concentrations.

Still another object of this invention is to provide an instrument which permits of rapid, precise and continuous measurements of continuously changing gas concentrations.

BRIEF DESCRIPTION OF THE DRAWINGS

FIGURE 2 is a graph for explaining one example of a measurement of the concentration of carbonic acid gas by the use of the instrument of this invention;

FIGURE 3 is a graph, similar to FIGURE 2, illustrating measured values under different conditions;

DESCRIPTION OF THE PREFERRED EMBODIMENTS

Figure 1:
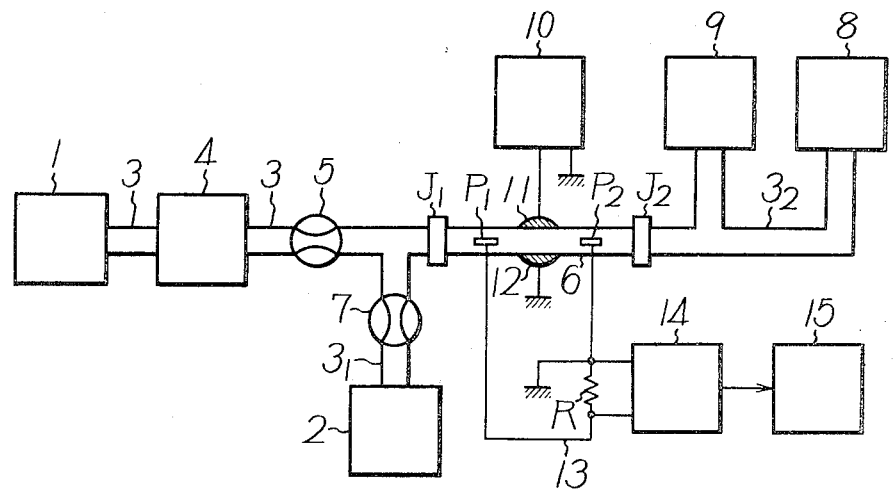
FIGURE 1 is a schematic diagram illustrating one example of a gas concentration measuring instrument according to this invention.

With reference to the drawings a description will be given of one example of this invention. In FIGURE 1 reference numeral 1 indicates a gas source containing one or more kinds of gases, which gas source will hereinafter be referred to as a carrier gas source. Reference numeral 2 designates another gas source containing a gas to be measured, which gas source will hereinafter be referred to as a sample gas source. The gases contained in the carrier and sample gas sources 1 and 2 are all ionizable. The carrier gas should be selected substantially to exclude the same kind of gas as that contained in the sample gas source 2. In other words, it is necessary to select the carrier gas so that its ionization tendency may be different from that of the sample gas to be measured.

Reference numeral 3 identifies a pipe made of, for example, vinyl chloride or the like for guiding the gas of the carrier gas source 1 into a detecting tube 6 formed of an insulating material such as glass or the like. Namely, the pipe 3 interconnects the carrier gas source 1 and the detecting tube 6. Reference character $J_1$ designates means for joining the detecting pipe 6 and the pipe 3. The pipe 3 has incorporated therein a flow meter 4 for measuring the quantity of flow of the carrier gas flowing through the pipe 3 and a choke or valve 5 for controlling the flow rate of the carrier gas. Meanwhile the detecting tube 6 is supplied with the gas from the sample gas source 2 through a pipe $3_1$ formed of vinyl chloride or the like. That is, the pipe $3_1$ is connected at one end to the sample gas source 2 and at the other end to the pipe 3 at the intermediate portion between the choke 5 and the detecting tube 6. Reference numeral 7 indicates a choke or valve for controlling the flow rate of the sample gas flowing into the detecting tube 6, the choke 7 being provided in the pipe $3_1$, as illustrated. The tubular portion connecting the chokes 5 and 7 and the detecting tube 6 is formed to withstand high pressure, as usual. Reference numeral 8 designates a vacuum pump, which is connected airtightly by joint means $J_2$ to the detecting tube 6 on the opposite side from the pipe 3 through a high pressure pipe, for example, a high pressure rubber pipe $3_2$. By the action of the vacuum pump 8 the gases of the carrier and sample gas sources 1 and 2 may be caused to flow in the detecting tube 6 toward the vacuum pump 8. Reference numeral 9 designates a vacuum gauge interconnected with the pipe $3_2$, which measures the degree of vacuum in the pipe $3_2$ or in the detecting tube 6.

In the present invention a device is provided by means of which the gases flowing through the detecting tube 6 are ionized therein, in other words, vacuum discharge, for example, glow discharge is produced by the gases. Namely, an oscillator 10 having a frequency of, for example, 40 kHz. to 1 mHz. and an output voltage of about 1.5 kv. to 2.5 kv. is provided, and its output side electrode 11 is disposed on the outside of the detecting tube 6 substantially at the center thereof. Meanwhile, an electrode 12 cooperating with the electrode 11 is located on the outside of the detecting tube 6 at a place corresponding to the electrode 11, and the electrode 12 is grounded, thereby producing glow discharge in the detecting tube 6. With bias energy applied between the electrodes 11 and 12 by, for example, ultraviolet rays, vacuum discharge can be caused, even if the voltage of the oscillator 10 is small. Reference characters $P_1$ and $P_2$ indicate electrodes disposed in the detecting tube 6 ahead of and behind the opposed electrodes 11 and 12 relative to the gas stream, while being spaced therefrom substantially equal distances.

Figure 5:
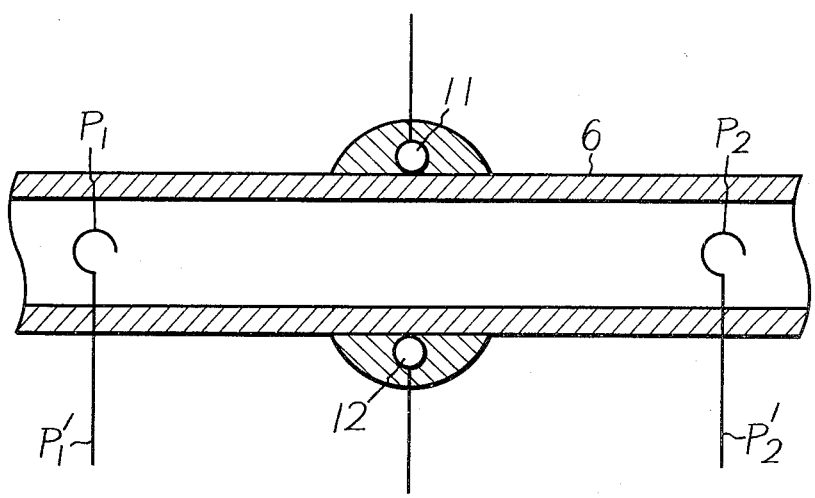
FIGURE 5 is an enlarged cross-sectional view of the principal part of the instrument depicted in FIGURE 1.

The detecting tube 6 is, for example, a glass tube having an inner diameter of 4 mm., an outer diameter of 6 mm. and a length of 30 cm. The electrodes 11 and 12 are platinum balls having a diameter of 1.5 to 2.0 mm., which are fixed on the outside of the detecting tube 6 at predetermined positions, while being covered with glass or the like. In this case, it is preferred that lead wires of the electrodes 11 and 12 are platinum wires having a diameter of approximately 0.5 mm. Further, the electrodes $P_1$ and $P_2$ are also formed of platinum wires $P_1'$ and $P_2'$ inserted into the detecting tube 6 and the inserted portions are respectively bent in the form of a hook. It is preferred that the electrodes $P_1$ and $P_2$ are respectively positioned at a distance of 6 cm. from the electrodes 11 and 12, as illustrated in FIGURE 5.

In the present invention the electrodes $P_1$ and $P_2$ are interconnected by a lead wire 13 on the outside of the detecting tube 6 and a load resistor R having a resistance value of, for example, $10^9$ to $10^{10}$ ohms is incorporated in the lead wire 13. In addition, the load resistor R is connected at both ends to the input side of a DC amplifier 14, whose output side, in turn, is connected to, for example, an instrument such as, for instance, a voltmeter, a recorder or the like. The lead wire 13 is grounded, for example, at the connecting point between the electrode $P_2$ and the resistor R.

With such an arrangement as has been described in the foregoing, vacuum discharge is produced in the detecting tube 6 by driving the vacuum pump 8, by adjusting the chokes 5 and 7 for suitable selection of the flow rates of the carrier and sample gases flowing through the detecting tube 6 and by actuating the oscillator 10. In this case, a current flows in a circuit from the electrode $P_1$ through the resistor R and the electrode $P_2$ and back to the electrode $P_1$. Although the current value depends upon the discharge voltage, the pressure and the quantity of the gases in the detecting tube 6, it is dependent upon the kinds and concentrations of the gases flowing through the detecting tube 6, if the aforementioned conditions are held constant.

The present invention is to measure the gas concentration based on the principles described in the foregoing. Now, this invention will be described as applied to, for example, the measurement of carbonic acid gas $CO_2$ by the use of the instrument exemplified in FIGURE 1, in which case the carrier gas is air. Although carbonic acid gas is contained in the air, its amount is negligibly small relative to that contained in the sample gas and accordingly the use of the air would not cause any trouble in practical measurements. In this case, the amount of carbonic acid gas contained in the air is approximately 0.05%. While, the present invention instrument is to measure carbonic acid gas of a concentration down to 0.1%, so that carbonic acid gas of 0.05% or so is negligibly small in fact and would not introduced any trouble in practical measurements.

The vacuum pump 8 is first put in operation and the choke 5 is then adjusted such that the flow meter 4 indicates 15.8 cm.³/sec. Further, the choke 7 is opened about 1/100 relative to the choke 5, namely the flow rate of the sample gas (in this example, air) is controlled to be approximately 1/100 of that of the carrier gas. In such a case, the vacuum gauge 9 indicates a value of 8 torr. Following this, a mixture gas, which contains 10.10% by volume of carbonic acid gas previously measured by, for example, a Shorander gas analyzer and nitrogen gas and oxide gas, is introduced as a sample gas into the aforementioned sample gas source 2. That is, in this case the carrier gas (air) from the carrier gas source 1 and the sample gas (the mixture gas containing 10.10% by volume of carbonic acid gas) from the sample gas source 2 flow through the detecting tube 6.

The relation between the time $t$ when the frequency and voltage of the oscillator 10 are respectively selected 1 mHz. and 2 kv. under the above conditions and the deflection A of the pointer of the instrument, for example, a recorder in this case, if indicated by a portion $C_1$ of a curve C in the graph shown in FIGURE 2, in which the abscissa represents the time $t$ and the ordinate the deflection A of the pointer of the recorder. The other portions $C_2$ to $C_6$ of the curve C in the figure similarly illustrate the relations between the time and the deflection of the pointer of the recorder in the cases where the mixture gas introduced into the aforementioned sample gas source 2 contains respectively 6.70%, 5.90%, 5.60%, 3.25% and 2.90% by weight of carbonic acid gas $CO_2$ together with nitrogen and oxide gases in a suitable proportion. In these cases the other conditions are exactly the same as those when the portion $C_1$ is obtained. The minimum values of the curve C in the graph indicate deflection of the pointer of the recorder due to discharge of the carrier gas.

FIGURE 3 is a graph similarly showing measured values of the concentration of the carbonic acid gas with its flow rate and pressure being respectively 21.00 cm.³/sec. and 10 mm. Hg while the other conditions being the same as those in the example depicted in FIGURE 2.

Figure 4:
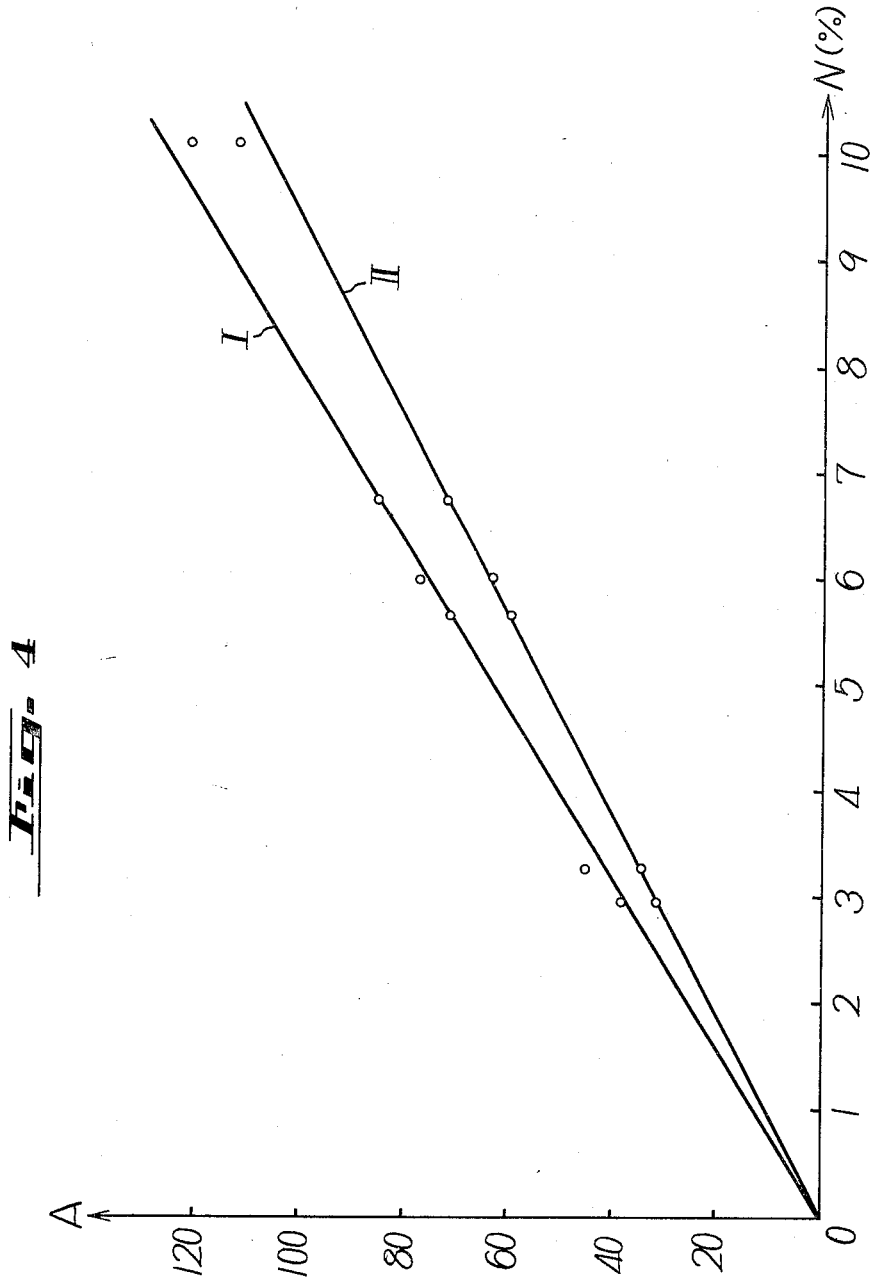
FIGURE 4 is a graph showing the relation between the concentrations of carbonic acid gas and the deflection of the pointer of an instrument, based upon FIGURES 2 and 3.

FIGURE 4 is a graph consolidating the measured values shown in FIGURES 2 and 3, in which the abscissa represents the concentration N of the carbonic acid gas contained in the mixture gas in the percent by volume and the ordinate the deflection A of the pointer of the recorder. That is, the curve I in FIGURE 4 corresponds to the results shown in FIGURE 2 and the curve II to those depicted in FIGURE 3.

As is apparent from FIGURE 4, these curves I and II can be regarded as substantially straight. Namely, this indicates that the concentration of the carbonic acid gas and the deflection of the pointer of the instrument are in substantially linear proportion. In other words, when the instrument depicted in FIGURE 1 is used with a mixture gas containing carbonic acid gas of unknown concentration in the sample gas source 2, the concentration of the carbonic acid gas contained in the sample gas can be known from the graph shown in FIGURE 4 based on the deflection of the pointer of the recorder 15.

While the present invention has been described in connection with the measurement of the concentration of the carbonic acid gas contained in the mixture gas, the present invention can be applied to the measurement of the concentration of any kind of gas such, for example, as oxide contained in the mixture gas. For measuring the concentration of oxide, however, an experiment similar to the aforementioned one is conducted in advance which employs as a carrier gas a mixture gas containing, for example, nitrogen gas and carbonic acid gas but excluding oxide and employs as a sample gas oxide of known different concentration, thereby making a graph similar to, for example, FIGURE 4, illustrating the relation between the deflection of the pointer of the recorder and the oxide concentration. Then, a mixture gas containing oxide of unknown concentration is used as a sample gas, by which the oxide concentration in the mixture gas can readily be known from the graph based on the deflection of the pointer of the recorder.

As has been described in the foregoing, the instrument of this invention permits of easy, precise, continuous and stable measurements of the concentration of a desired one of mixed gases, for example, the concentration of alcohol in the air, by selecting the relation between the carrier gas and the sample gas. In addition, this invention instrument is simple in construction, easy to produce and inexpensive.

Since the present invention allows rapid, precise and continuous measurements of a desired one of mixed gases as described above, this invention is suitable for measuring the concentrations of various gases contained in human breaths and accordingly this invention is of particular utility when employed for making a diagnosis of the cause of a respiratory disease.

It will be apparent that many modifications and variations may be effected without departing from the scope of the novel concepts of this invention.

I claim as my invention:

1. A gas concentration measuring instrument comprising a gas source containing a gas to be measured, a carrier gas source containing a gas of a different ionization tendency from that of the gas to be measured, a common passage, a passage interconnecting the two gas sources, and the common passage, means for introducing the gases contained in the two gas sources into the common passage, means for adjusting the flow rates of the gases, the adjusting means being provided in the passage, means for ionizing the mixed gases from the two gas sources in the common passage, means forming a pair of inert metal electrodes disposed in the common passage ahead of and behind the position where ionization of the mixed gases is effected relative to the gas stream so that one of the pair of electrodes is immersed in a solution of the ions of the gas and another of the pair of electrodes has no ions in its vicinity, circuit means including the electrodes and disposed on the outside of the common passage for measuring the electric potential between the electrodes to indicate the concentration of the gas.

2. A gas concentration measuring instrument as claimed in claim 1 wherein means for ionizing the mixed gases consist of two opposed electrodes disposed on the outside of the common passage and means for feeding voltage to the opposed electrodes.

3. A gas concentration measuring instrument as claimed in claim 2 wherein the voltage feeding means is an oscillator.

4. A gas concentration measuring instrument as claimed in claim 1 wherein a flow meter is provided between the carrier gas source and the common passage for measuring the flow rate of the gas flowing into the common passage from the carrier gas source.

5. A gas concentration measuring instrument as claimed in claim 1 wherein the means for introducing the gases from the first-mentioned gas source and the carrier gas source into the common passage is a vacuum pump.

6. A gas concentration measuring instrument as claimed in claim 1 wherein the circuit means includes a load resistor connected in series arrangement with the electrodes and an instrument connected in parallel with the load resistor for indicating the concentration of the gas to be measured.

7. A gas concentration measuring instrument as claimed in claim 6 wherein the instrument is a voltmeter.

8. A gas concentration measuring instrument as claimed in claim 6 wherein the instrument is a recorder.

9. A gas concentration measuring instrument as claimed in claim 1 wherein a vacuum gauge is provided in association with the common passage for measuring the degree of vacuum of the mixed gases in the common passage.

References Cited

UNITED STATES PATENTS

| | | | |
|---|---|---|---|
| 2,387,550 | 10/1945 | Winkler | 73—18 |
| 2,950,387 | 8/1960 | Brubaker | 250—41.9 |
| 2,959,677 | 11/1960 | Robison et al. | 250—43.5 |

RICHARD C. QUEISSER, Primary Examiner

JOHN K. LUNSFORD, Assistant Examiner